United States Patent Office 3,253,889
Patented May 31, 1966

3,253,889
PROCESS FOR REMOVING CHLORIDE IMPURITY FROM TiO₂ PRODUCT
Hans A. Wildt, Wilmington, and Horace J. Rundell, Newark, Del., assignors to E. I. du Pont de Nemours and Company, Wilmington, Del., a corporation of Delaware
No Drawing. Filed June 30, 1964, Ser. No. 379,376
6 Claims. (Cl. 23—202)

This invention relates to pigmentary titanium dioxide and to novel methods for its preparation through the vapor phase oxidation of titanium tetrachloride. More particularly, it relates to novel methods for removing contaminants, especially chlorides, from the $TiO_2$ reaction product obtained in said oxidation.

In the manufacture of $TiO_2$ pigments through the thermal decomposition at 700–1600° C. temperatures of vaporized, preheated titanium tetrachloride with oxygen or oxygen-containing gases, such as air, an incomplete reaction occurs to cause contamination of the $TiO_2$ reaction product exiting from the oxidation reactor with small, objectionable amounts of chloride impurities, including chlorine, $TiCl_4$, $TiOCl_2$ and HCl. These acidic impurities are deleterious because the $TiO_2$ product cannot be employed in many pigmenting applications, such as paints, enamels and finishes wherein compatibility and non-reactivity of pigment toward the coating composition vehicle is essential.

It has now been found that these and other disadvantages characterizing prior vapor phase oxidation methods for producing $TiO_2$ pigments can be effectively overcome and a salient object of this invention is to provide novel and effective methods and means for accomplishing such objects. It is among the particular objects of the invention to provide a process for removing objectionable chlorine-containing impurities adsorbed on the surface of $TiO_2$ pigment particles resulting from $TiCl_4$ oxidations; to provide novel and efficient methods for reducing the acidity of $TiO_2$ particles obtained in such $TiCl_4$ oxidation and through an expeditious method wherein such reduction and removal can be effected in minutes in contrast to hours; to effect removal of unreacted chlorides, HCl and chlorine by treatment of the $TiO_2$ particles while in the form of an aerosuspension within a confined treating zone; to effect concurrent cooling of the $TiO_2$ particles while removing chlorinaceous residues therefrom and without any attendant agglomeration of the $TiO_2$ particles under treatment; and to effect conversion of $TiCl_4$ to a suitable $TiO_2$ pigment by means of a continuous dry process of treatment. Other objects and advantages of the invention will be apparent from the ensuing detailed description thereof.

These objects are attained in this invention which comprises removing chloride impurity contaminants adsorbed on the surface of a $TiO_2$ product resulting from the vapor phase oxidation of $TiCl_4$ by aerosuspending said product within a treating zone maintained at temperatures ranging from 400–1000° C. and recovering the resulting dechlorinated $TiO_2$ product.

In a more specific embodiment the invention comprises removing adsorbed chloride contaminants from $TiO_2$ reaction products derived from the vapor phase oxidation of $TiCl_4$ by forming an aerosuspension of said products in air-steam in a treating zone maintained at temperatures ranging from 400–1000° C. to distill off and/or react said contaminants from the $TiO_2$ in the form of volatile chlorinaceous products, and recovering the resulting dechlorinated $TiO_2$ product.

In adapting the invention to practical application purification can be undertaken of, for example, a chloride contaminated $TiO_2$ reaction product resulting from the vapor phase oxidation of $TiCl_4$ produced in accordance with the disclosure of U.S. Patent 2,488,439, or of a $TiO_2$ reaction product containing about .1 to 10% by weight of $Al_2O_3$ obtained from the co-oxidation of $TiCl_4$ and $AlCl_3$ in accordance with the procedures of U.S. Patent 2,559,638. The $TiO_2$ product entrained in the gaseous reaction products emerging from the oxidation reactor at 700–1600° C., and usually at from 1000–1200° C. can be directly or indirectly cooled to a temperature ranging from 300–800° C. by such procedures as disclosed in U.S. Patents 2,833,637 and 2,721,626. Thereafter separation of the cooled gaseous products from the pigment phase can be undertaken by recourse to suitable gravitational means, such as in centrifugal or cyclone separators at temperatures ranging up to 1000° C. If desired the separation can be effected through filtration treatment and at temperatures as high as filter media strength will permit, which usually is about 400° C. or lower. Alternatively the separation can be carried out in other types of equipment such as in electrostatic, ultrasonic, etc. means.

The raw pigmentary $TiO_2$ product recovered from the separation contains, as noted, a low concentration of unreacted chlorides such as $TiCl_4$, $TiOCl_2$, HCl, AlOCl, $AlCl_3$, $Cl_2$ and other acidic materials adsorbed on the solid pigment surface. Usually from about 0.1–.2% total chlorides, expressed as HCl, is present in the product. The concentration of these chlorides can be determined by either direct analysis, expressed as percent chlorides, or the chlorides may be indirectly measured as determined by measuring the pH of an aqueous slurry containing the pigment, or through ascertainment of the electrical resistance of such aqueous slurry. In measuring pH, 50 grams of the pigment can be mixed for 5 minutes with 250 ccs. of deionized water and the resulting solution tested for pH at room temperatures. Normally the pH of the raw, contaminated pigment ranges between 3–4.5, depending upon operating conditions. Following treatment in accordance with this invention the pH value will be found to be in the range of 4.5–8 or essentially neutral. Electrical resistance of an aqueous pigment slurry can be measured employing a commercially available conductivity cell and bridge. Normally, the raw pigment analyzes below 4,000 ohms/cm., whereas the product treated in accordance with the present invention will become suitable for most commercial applications since its electrical resistance will range between 4,000 and 50,000 ohms/cm.

Following recovery of the raw $TiO_2$ pigment from the cooling and separation stages of the operation, treatment to remove undesired concentrations of chlorinaceous impurities present in the product is undertaken. This can be quickly brought about in this invention, and within a time period of less than 5 minutes and preferably within less than a period of one minute through the observance and regulation of three factors. These are: (1) the temperature employed, (2) the steam or water vapor pressure, or water vapor concentration used, and (3) the degree of contact and reaction which results between the $TiO_2$ solids and the gaseous treating and reaction agent. Thus, the contaminated $TiO_2$ product can be charged, preferably in aerosuspension or fluidized state, directly from the separator into an associated dechlorinator or treating zone maintained at temperatures ranging from 400° C. to 1000° C., and preferably at from 400° C. to 550° C. If desired, the $TiO_2$ particles prior to passage to the chlorinator can be preheated in suitable furnacing or heating means to such temperatures. In the dechlorinator the $TiO_2$ while maintained in aerated or bubbling bed condition, e.g. as a finely divided aerosol containing from 0.1 to 20 pounds of $TiO_2$ per cu. ft. of aerosol, is directly contacted and reacted with sufficient steam, oxygen or air (or mixtures thereof) to bring about the desired $TiO_2$ purification.

Generally it will be found that with the use of 400–1000° C. temperatures, steam treatment alone suffices to provide undesired chloride removal in the invention, while with the use of air and oxygen alone in an inert (argon or helium) supporting gas stream, temperatures ranging from 700–1000° C. will be required. At intermediate temperatures, mixtures of steam and air can be utilized, but in every instance use can be effected of auxiliary gases, such as nitrogen, carbon dioxide, or any gas other than oxygen or steam which will not be taken up by the pigment when such gas is employed to fluidize or propel the pigment for treatment into and within the dechlorinator.

Upon completion of the dechlorination a substantially neutral $TiO_2$ pigment product will be recovered which upon being milled in hammer, roller, fluid energy or micronizer equipment in a conventional manner will effect removal of undesired aggregates and reduce the size of the $TiO_2$ to desired fine pigment particles. The soft-textured, finished pigment obtained, being substantially neutral (pH 6.5–8) and high in tinting strength, color, opacity and other essential pigment properties, will be found to be generally useful for various pigmenting applications, including coating compositions, such as paints, enamels, lacquers and finishes, and as a delustreant for rayon, nylon or other synthetic fibers, as well as in the pigmenting of printing inks, rubber, plastics, etc.

To a clearer understanding of the invention the following specific examples are given. These are illustrative only and are not to be construed as in limitation of its underlying principles and scope.

*Example I*

A silica tube treating apparatus having an internal 6 inch diameter and 8 feet in length was set up vertically within a conventional type electric furnace. The base of this tube was sealed and equipped with a silicate inlet tube connected to a source of hot air supply.

Six pounds of raw, chloride impurity contaminated $TiO_2$ pigment obtained from the vapor phase oxidation of $TiCl_4$ in accordance with the procedures disclosed in U.S. Patent 2,488,439, and having an average particle size of .2 to .3 micron, a pH of 3.5 and an electrical resistance of 1,000 ohms, was charged to the silica treating tube and was fluidized and heated therein to 450° C. by introducing 2 cu. ft. of air/minute from a preheater maintained at 450–500° C. Approximately one cu. ft./minute of steam, superheated to 450–500° C. was then fed to the bed with the hot air, the flow of the latter being reduced in rate to one cu. ft./minute. After a period of 5 minutes of treatment had elapsed, a sample of the $TiO_2$ under treatment was taken from the tube for examination and testing. Such sample was found to have a pH of 4.7 and an electrical resistance of 16,000 ohms/cm. The run was repeated but with the employment of normal, dry air only as the treating gas. From this run a $TiO_2$ pigment having a pH of 4.5 and an electrical resistance of 12,000 ohms/cm. was obtained.

The $TiO_2$ products obtained in the foregoing operations, after conventional pigment finishing treatment were found to provide an excellent $TiO_2$ pigment adaptable for use in various pigment applications mentioned above.

*Example II*

The procedure of Example I was duplicated, utilizing an equal quantity of the same raw $TiO_2$ pigment. Two cu. ft./minute of superheated steam at 450° C. was passed into the tube through the fluidized $TiO_2$ bed which was maintained at a temperature of 450° C. This was continued for 5 minutes but without the use of any propelling air flow. The amount of steam employed was approximately equal to 15 pounds $TiO_2$ per pound of steam. By reason of the improved properties exhibited by the finished pigment, particularly its improved pH, resistance, strength, texture and gloss properties the product is found to be eminently suited for use in all types of pigmenting applications.

*Example III*

A vaporized mixture consisting of 98% by volume of titanium tetrachloride and 2% by volume of aluminum chloride preheated to 920° C., was continuously admitted, at a rate equivalent to 140 parts by weight per hour, through a separate inlet into the upper portion of a vertical, corrosion resistant reaction chamber maintained at a temperature of 1170° C. Simultaneously, humidified air, preheated to about 900° C. containing sufficient water vapor to provide a 0.95% water content by volume was continuously admitted to a separate inlet to said chamber adjacent said mixed metal chloride inlet and at a rate equivalent to 26 parts by weight of oxygen per hour. The separate inlets through which the reactants were admitted were so arranged with respect to each other that the gas streams on entering the chamber converged immediately upon their introduction within a reaction zone in said chamber whereby the reactants became rapidly and substantially instantaneously mixed and reacted in said zone of said chamber. The flow rates used provided an average retention time of reacting gases within the reaction zone of about 0.5 second. The gaseous suspension of composite $Al_2O_3$–$TiO_2$ formed within said zone was discharged from the bottom of the chamber at a temperature of approximately 1130° C. and injected into a cyclone separator to remove process gases. The raw chloride-contaminated $TiO_2$ at 600° C. educted from the base of said separator was then propelled together with 40 lb. steam at 450° C. through 2 successive cyclone separators over a period of 35 seconds, the total steam used being equivalent to 5 lbs. $TiO_2$ per lb. of steam with ½ the total being injected at each cyclone. The purified $TiO_2$ product resulting from this operation was found on analysis to be substantially free of chloride contaminants and to have a pH ranging between 6.3 to 8.2 and an electrical resistance in the range of 20,000–50,000 ohms, rendering the product on subsequent finishing treatment highly useful as a high grade pigment.

One particular advantageous result obtained from practicing this invention is the elimination of the time-consuming, expensive calcination treatment to which the separated raw $TiO_2$ pigment product has been subjected to effect removal of adsorbed chlorides. In addition to this desirable economic advantage a definite pigment quality improvement is obtained. Previously, the long calcination times at relatively high temperatures in a rotary kiln have resulted in the production of an agglomerated pigment which has required extended grinding treatment to render the product satisfactory for pigmentary purposes.

That there is a definite relationship between the composition of the treating gas used, the temperature of the treatment, and the quantity of gas needed per pound of pigment under treatment, can be shown by a series of comparative curves. Thus in the fluidized bed treatment of raw $TiO_2$ containing, for example 0.22% chlorine, with the use of a pound of steam at 400–1000° C., approximately 10–40 pounds of raw $TiO_2$ aerosol can be neutralized within a 5 minute period to a pH of 6–8 with a resistivity greater than 15,000 ohms. When on the other hand air use alone is resorted to only 10–25 pounds of $TiO_2$ per pound of air is neutralized at temperatures of 700–1000° C. This air, though dried prior to use, will contain some moisture which may desirably enhance chloride removal. With the use of a 50–50 air-steam mixture it will be found that in progressing from air to steam only, a twofold advantage is obtained over air in the 700–1000° C. range. That is, with such 50–50 mixture recourse to a lower, e.g. 500° C. temperature can be had whereas with the use of steam alone temperatures as low as 400° C. prove effective in contrast to the minimum 700° C. temperature required in effecting neutralization with air alone. However, in operating with air at such higher 700–1000°

C. temperatures, the possibility of undesired particle size growth and agglomeration (sintering of 2 or more particles together) exists. Since particle size growth exerts a deleterious effect on basic pigment properties, such as hiding power, opacity, etc. and agglomeration induces poor gloss characteristics, dispersion and other undesired effects, rectification of agglomeration by increasing grinding treatment will be required, whereas particle size increase cannot be reduced economically. For these reasons we prefer to conduct the treating operation at temperatures of a relatively low order and say from 400–550° C. with steam and an auxiliary gas, preferably air, in levels of 15–25 pounds/$TiO_2$/lb. of steam.

Although the invention has been described as applied to particular embodiments, it obviously is not limited thereto. Thus, although recourse to a fluidized bed and use of cyclone type separators has been mentioned in the examples as useful equipment concepts, other equipment and concepts, including fluidizing vessels, pneumatic conveyors and rotary equipment are also suitable for obtaining the titanium dioxide pigment aerosuspension utilized herein.

Again, while particularly applicable to treating titanium dioxide particles from the vapor phase oxidation of titanium tetrachloride, the invention can also be applied to the treatment of $TiO_2$ particles obtained from the hydrolysis of titanium tetrachloride and filtering to remove the resulting acidic slurry.

The fluidizing or aerosuspending gas used can consist of inert gases as well as oxygen and steam. However, in obtaining the desired, economically fast reaction, an oxygen containing gas, such as oxygen, steam, water vapor or a combination of such these gases must be present in the treating mixture. Gases which tend to oxidize titanium oxychloride, aluminum oxychloride, or chlorides of these metals to their oxides, also are suitable, gases which produce water vapor, for example, hydrogeneous fuels which when combined with air or oxygen produce water vapor and heat, when combined with raw titanium dioxide, are also effective for use as an air-steam mixture for removing chlorides absorbed on the $TiO_2$.

The process can be carried out on a continuous basis, if desired. In such instances, the $TiO_2$ pigment and process gases are passed from the oxidation reactor into a series of cyclone separators, suitably constructed to withstand the prevailing high temperatures and corrosive nature of materials passing therethrough. In the first cyclone separator the process gases are separated from the $TiO_2$ which is educted into the air-steam mixture and is then passed, via a suitable communicating conduit into a second cyclone separator where steam and absorbed chlorides are removed from the solids which are then educted by fresh steam and held in a third cyclone where the gases are further separated. Usually 2 or more stages of cyclones are required in processing the pigment under treatment in this fashion. Alternatively, a heated fluidized bed treater, heated and fed continuously with raw pigment at the base portion of the vessel while removing the chloride-free pigment from the upper portion thereof can be resorted to. In such instances the residence time of the pigment in the bed can be regulated by the bed height, gas rate and degree of fluidization being effected.

We claim:

1. A process for quickly removing a chloride impurity from raw pigmentary $TiO_2$ directly resulting from the oxidation of $TiCl_4$ at an elevated temperature, which consists in subjecting said $TiO_2$ while in aerosuspension at a concentration ranging from 0.1 to 20 lbs. of $TiO_2$ per cu. ft. of aerosuspension to direct contact for a period of less than 5 minutes in a treating zone maintained at a temperature ranging from 400 to 1000° C., with a gaseous treating agent selected from the group consisting of water vapor, air, oxygen and mixtures thereof, and thereafter immediately recovering the purified $TiO_2$ product.

2. A process for quickly removing a chloride impurity from raw pigmentary $TiO_2$ directly recovered from the oxidation of $TiCl_4$, which consists in subjecting an aerosuspension of said $TiO_2$ to direct contact for a period of less than 5 minutes within a treating zone while maintained at temperatures ranging from 400 to 1000° C., with a gas selected from the group consisting of water vapor, air, oxygen and mixtures thereof, employing in the process a rate of treating gas addition of about one pound per 10–40 pounds of $TiO_2$ under treatment, and thereafter immediately recovering the purified $TiO_2$ product.

3. A process for quickly removing undesired chloride impurity from raw pigmentary $TiO_2$ directly recovered from the oxidation of $TiCl_4$ which consists in directly contacting said $TiO_2$ with steam for a period of less than 5 minutes while said $TiO_2$ is in aerosuspension at a concentration ranging from 0.1 to 20 pounds of $TiO_2$ per cu. ft. of aerosuspension, in a treating zone maintained at temperatures ranging from 400–700° C. and thereafter immediately recovering the resulting purified $TiO_2$ product.

4. A process for quickly removing undesired chloride impurity from raw pigmentary $TiO_2$ directly recovered from the oxidation of $TiCl_4$ which consists in directly contacting said $TiO_2$ with steam and an auxiliary gas for a period of less than 5 minutes in a treating zone maintained at temperatures ranging from 400–550° C., employing in the process from 15–25 pounds/$TiO_2$/lb. of steam, and thereafter immediately recovering the resulting purified $TiO_2$ product.

5. A process for quickly removing chloride contaminants from the raw pigmentary $TiO_2$ product directly resulting from the oxidation of $TiCl_4$ which consists in subjecting said $TiO_2$ while in aerosuspension at a concentration ranging from 0.1 to 20 pounds of $TiO_2$ per cu. ft. of aerosuspension, to direct contact for a period of less than 5 minutes with air in a treating zone maintained at temperatures ranging from 700–1000° C., and thereafter immediately recovering the resulting purified $TiO_2$ product.

6. A process for quickly removing chloride contaminants from raw pigmentary $TiO_2$ directly resulting from the oxidation of $TiCl_4$ which consists in subjecting an aerosuspension of said $TiO_2$ wherein the concentration of $TiO_2$ present ranges from 0.1 to 20 pounds of $TiO_2$ per cu. ft. of aerosuspension, to direct contact with a 50–50 steam-air mixture for a period of less than 5 minutes within a treating zone maintained at a temperature ranging from 400–700° C., and thereafter immediately recovering the resulting purified $TiO_2$ product.

References Cited by the Examiner

UNITED STATES PATENTS

| | | | |
|---|---|---|---|
| 2,865,622 | 12/1958 | Ross | 23—202 X |
| 2,899,278 | 8/1959 | Lewis | 23—202 |
| 3,060,001 | 10/1962 | Hughes et al. | 23—202 |
| 3,088,840 | 5/1963 | Arkless et al. | 23—202 |
| 3,107,150 | 10/1963 | Angerman | 23—202 |
| 3,112,178 | 11/1963 | Judd | 23—202 |

FOREIGN PATENTS

| | | |
|---|---|---|
| 241,492 | 6/1960 | Australia. |
| 1,150,955 | 7/1963 | Germany. |

BENJAMIN HENKIN, *Primary Examiner.*

MAURICE A. BRINDISI, *Examiner.*

E. STERN, *Assistant Examiner.*